US007150260B2

(12) United States Patent
Arevalo et al.

(10) Patent No.: US 7,150,260 B2
(45) Date of Patent: Dec. 19, 2006

(54) INTEGRATED AIR INDUCTION SYSTEM

(75) Inventors: Hever Arevalo, Woodbridge (CA); Timothy W. Chapman, Etobicoke (CA); Robert Graham, Aurora (CA); Changize Sadr, North York (CA)

(73) Assignee: Salflex Polymers Ltd., Weston (CA)

( * ) Notice: Subject to any disclaimer, the term of this patent is extended or adjusted under 35 U.S.C. 154(b) by 0 days.

(21) Appl. No.: 11/098,451

(22) Filed: Apr. 5, 2005

(65) Prior Publication Data

US 2005/0224036 A1 Oct. 13, 2005

Related U.S. Application Data

(60) Provisional application No. 60/559,954, filed on Apr. 7, 2004.

(51) Int. Cl.
*F02B 77/04* (2006.01)
*F02M 35/10* (2006.01)
*B01D 50/00* (2006.01)

(52) U.S. Cl. ................. 123/198 E; 181/229; 55/385.3; 123/184.57

(58) Field of Classification Search ........... 123/184.57, 123/198 E; 181/229, 228; 55/385.3, 498
See application file for complete search history.

(56) References Cited

U.S. PATENT DOCUMENTS

| | | | |
|---|---|---|---|
| 4,440,555 | A | 4/1984 | Chichester |
| 4,548,166 | A | 10/1985 | Gest |
| 4,929,263 | A | 5/1990 | Kasugai |
| 5,197,426 | A | 3/1993 | Frangesch et al. |
| 5,433,772 | A | 7/1995 | Sikora |
| 5,647,314 | A | 7/1997 | Matsumura et al. |

*Primary Examiner*—Noah P. Kamen
(74) *Attorney, Agent, or Firm*—Bereskin & Parr

(57) ABSTRACT

This invention relates to an automotive air filter assembly, in particular, an assembly which includes an air flow chamber portion and a liquid reservoir portion. The air flow portion includes a panel filter for filtering air flowing to an engine. The panel filter includes air filtration media and hydrocarbon absorption media to inhibit release of hydrocarbon vapours to the air on engine shut down. The air flow portion also may include resonance chambers for acoustic silencing purposes. The liquid reservoir portion can include a pump for delivery of fluid such as windshield washer fluid.

17 Claims, 2 Drawing Sheets

INTEGRATED AIR INDUCTION SYSTEM

This application claims benefit from U.S. provisional application Ser. No. 60/559,954 filed Apr. 7, 2004 which is incorporated herein by reference in its entirety.

FIELD OF THE INVENTION

This invention relates to automobile components, in particular the invention relates to air filter assemblies for use with internal combustion engines and in particular, air filtration assemblies which serve multiple functions.

BACKGROUND OF THE INVENTION

Internal combustion engines require a source of clean air and accordingly, it is typical in automotive applications to provide a housing which contains a replaceable air filtration cartridge. Such assemblies are placed in the engine compartment where they can be conveniently ducted to the engine air inlet point. The space in the engine compartment under the hood is typically at a premium. Accordingly, it is desirable that the housing serve other functions where possible.

SUMMARY OF THE INVENTION

In accordance with the present invention, an automotive air filtration assembly comprises an air flow chamber portion and a liquid reservoir portion. The air flow chamber portion defines an air flow inlet for ambient air and an air flow outlet for supply of clean air to the engine. The air flow chamber portion defines a suitable slot for receiving a panel filter and includes means for providing replacement of the panel filter in connection with routine maintenance. The fluid reservoir portion includes a fluid filler conduit, a fluid chamber for holding fluid and a fluid outlet. Most conveniently, the fluid reservoir portion is utilized for storage of fluid such as windshield washer fluid. In accordance with an advantageous embodiment of the invention, the housing may also define a clip, the clip locating an additional liquid reservoir such as a power steering fluid reservoir.

BRIEF DESCRIPTION OF THE DRAWINGS

A better understanding of the invention may be had from reference to the attached figures which illustrate an air filter assembly in accordance with a first embodiment of the invention and in which.

DETAILED DESCRIPTION OF THE INVENTION

The air filter assembly, indicated generally at 10, includes an air flow chamber portion 12 and a liquid reservoir portion 14.

Figure 1:
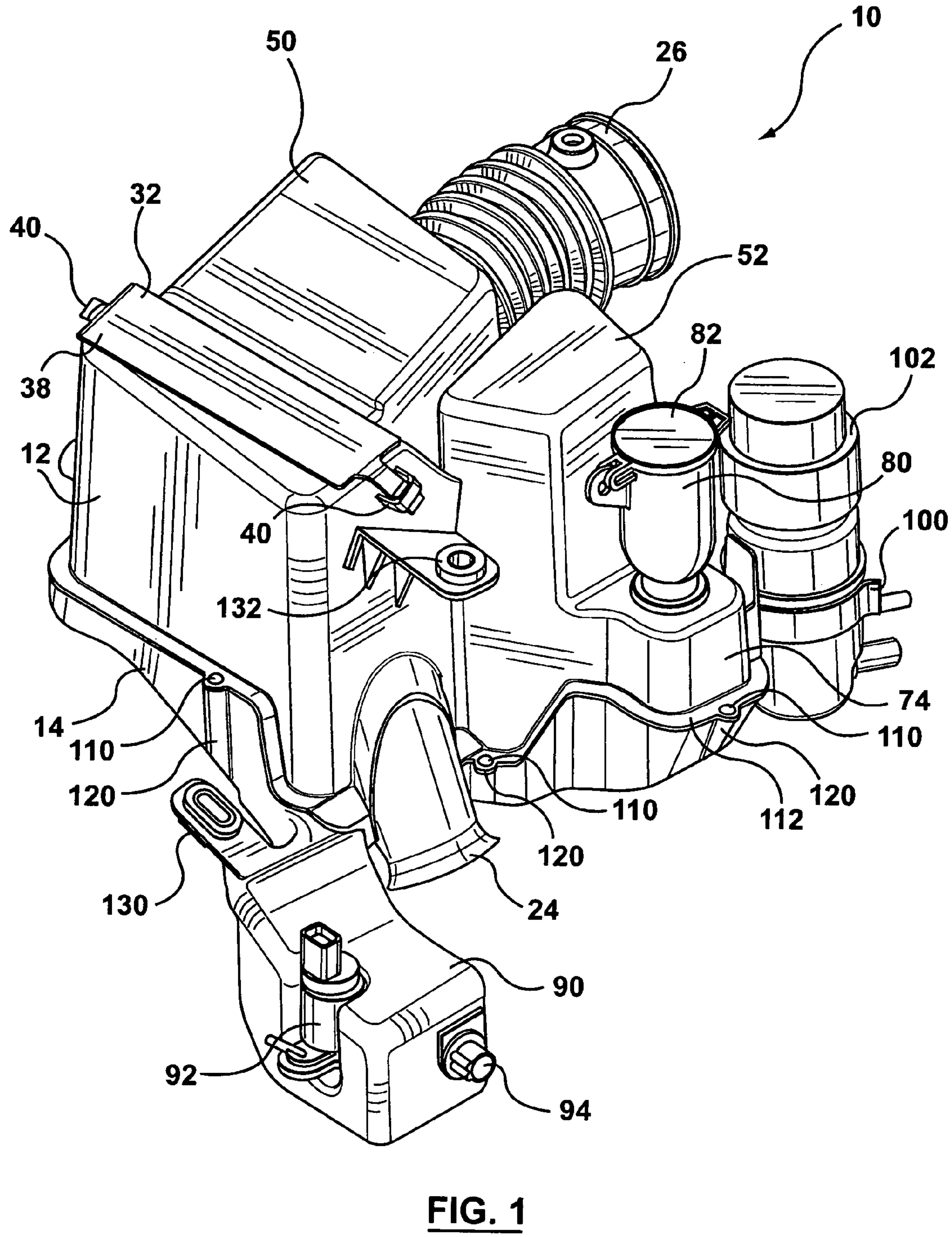
FIG. 1 is a perspective view of the embodiment.
Figure 2:
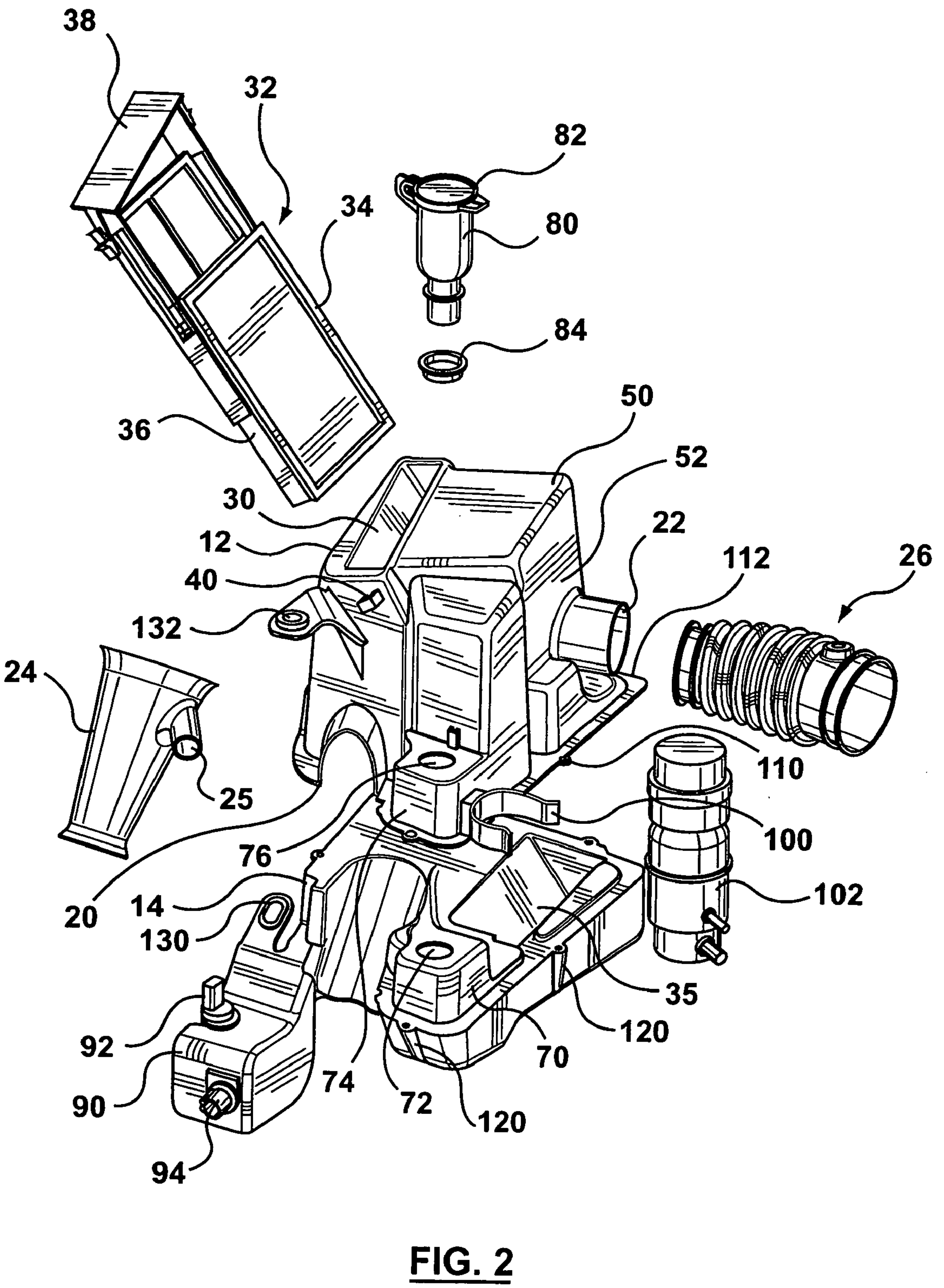
FIG. 2 is an exploded perspective view of the embodiment of FIG. 1.

The air flow chamber portion 12 defines an air flow inlet 20 and an air flow outlet 22 (FIG. 2). An air flow inlet snorkel 24 is attached to the air flow inlet 20. The air flow inlet snorkel 24 may include a subsidiary branch inlet 25 for connection to an acoustic resonator. Conveniently, a corrugated air flow outlet duct, illustrated generally as 26, is attached to the air flow outlet 22. The air flow outlet duct 26 may be of any suitable configuration and length so that it may be attached to the motor air flow inlet. That inlet may be of any type depending upon the vehicle fuelling system.

The air flow chamber portion 12 defines a slot 30 for housing a panel filter assembly 32. The slot 30 extends downwardly and forwardly toward the air flow outlet, thereby providing a generally wedge shaped inlet area on the intake side of the panel filter assembly, The panel filter assembly 32 includes a generally U-shaped, injection molded, housing 34 which contains a replaceable filter media 36 and a handle/retainer 38. The handle/retainer 38 is received within air flow filter chamber portion clips 40 located on the air flow chamber portion 12 opposite either side of the slot 30. The clips 40 and the handle/retainer 38 function to permit replacement of the filter media 36 as part of routine maintenance.

Air induction systems for automobiles require acoustic considerations in design. Typically, the air flow chamber portion 12 defines at least one acoustic chamber 50 for attenuation of sound waves in the air induction system. Advantageously, there may be a second acoustic chamber 52 which also serves to help in sound attenuation. While the shape and configuration of the acoustic chambers 50 and 52 are open for design and selection by the designer, the requirement for such chambers is one of the significant space issues in designing the assembly of the present invention. Sufficient space must be made available to permit the acoustic design necessary. Acoustic considerations may also require use of a resonator which may be ducted to the snorkel 24. A duct connection 25 may be incorporated into the snorkel 24 for this purpose.

One of the major advantages of the present invention, is that it provides for a panel filter to be contained within the slot 30. The panel filter may include a single function filtration media suitable for the purpose of filtering incoming air to the requisite degree of cleanliness. However, another important aspect of pollution control requirements now being mandated, is to ensure that the amount of hydrocarbon back flow from an engine on shut down be minimized. Accordingly, the panel filter may include addition media such as hydrocarbon adsorbers which will help diminish any reverse flow of hydrocarbon vapors from the engine fuelling system after engine shut down. Such systems work by adsorbing the hydrocarbons that might pass upstream from the engine fuelling system and are retained on the adsorber. When the engine is started again, incoming air is drawn through the adsorber and the hydrocarbons are drawn back into the engine for normal combustion.

Advantageously, the air flow chamber portion 12 and the panel filter housing 34 are injection molded. The injection molded parts can then be made with sufficient accuracy to ensure appropriate sealing so that there is no escape of hydrocarbon vapors from the assembly, nor is there any unwanted air inlet leakage.

The liquid reservoir portion 14 of the assembly 10 comprises an internal closed chamber for retaining of liquids. The liquid reservoir portion 14 is advantageously made in a blow molding operation, a manufacturing process which is particularly suited to making hollow articles. The liquid reservoir portion 14 comprises an upstanding boss 70 having an inlet aperture 72. The air flow chamber portion 12 includes an upstanding boss 74 with an inlet aperture 76. In the assembled condition, the aperture 76 of boss 74 is aligned over aperture 72 of boss 70 to provide a fluid communication conduit to the chamber of liquid reservoir portion 14. The liquid handling system advantageously includes a liquid filler pipe 80 having an openable and closable cap 82. The liquid filler pipe 80 works together with a seal 84 to sealingly engage the aperture 76 to provide a leak-free fluid communication between the cap 82 and the chamber within the liquid reservoir portion 14.

The liquid reservoir portion 14 may also include an outstanding and preferably downwardly extending boss 90. The outstanding boss 90 may include a pump 92 together with a liquid level sensor 94. The pump 92 can deliver fluid from the chamber within the liquid reservoir portion 14 under pressure. Most preferably, the liquid reservoir portion 14 can be utilized to contain disposable fluid such as windshield washer fluid. As the chamber is emptied, more fluid can be filled into the container through the cap 82.

The liquid reservoir portion 14 advantageously includes a recess 35 to receive the lower end of the panel filter assembly 32 when the unit is assembled and the filter panel assembly is put in place.

Advantageously, the air flow chamber portion 12 may define a retention clip 100. The retention clip 100 may then be used to position an additional liquid reservoir 102. In this case, the additional liquid reservoir 102 may be used for other automobile fluids such as power steering fluid.

The air flow chamber portion 12 and the liquid reservoir portion 14 are affixed together as an assembly by means of a plurality of screws 110 which may be placed around the periphery of a flange 112 of the air flow chamber portion 12. The plurality of screws 110 engage a plurality of bosses 120 formed in the periphery of the liquid reservoir portion 14.

The assembly 10 may be affixed to the vehicle by means of outstanding flanges such as those illustrated at 130 and 132. The flanges 130 and 132 are positioned as necessary so that the assembly may be fixed to the vehicle at convenient mounting points.

The embodiment illustrated in the figures, thus provides an assembly of several components. The assembly defines the air flow path for the vehicle from inlet through a filter to a clean air delivery duct and provides appropriate space and configuration to meet the vehicle inlet air flow considerations including acoustic requirements as well as providing an appropriate seal to minimize reverse flow of hydrocarbon vapors on engine shut down. The housing defines a slot for use with a panel type filter cartridge which may include suitable media for air cleaning and vapor retention. In addition, the assembly provides a liquid reservoir with a refill cap and pump mounting. In addition, in the embodiment illustrated in the figures, the assembly includes an additional reservoir for including an additional liquid such as power steering fluid. This whole assembly can be assembled prior to delivery of the assembly to the typical automobile assembly plant thereby reducing the amount of assembly required at the automotive assembly plant while still providing an assembly meeting a plurality of engine compartment requirements.

The invention claimed is:

1. An automotive air filter assembly comprising:

an air flow chamber portion, a liquid reservoir portion, said liquid reservoir portion defining a closed internal chamber for retaining liquids and a panel filter, the air flow chamber portion defining an air flow inlet, an air flow outlet and a slot therebetween for receiving the panel filter so that air passing from said air inlet to said air outlet passes through said panel filter and wherein said air flow chamber portion and said liquid reservoir portion are fixed together to form said assembly.

2. The automotive air filter assembly of claim 1 wherein the panel filter comprises at least one air filtration media and at least one hydrocarbon absorption media.

3. The automotive air filter assembly of claim 2 wherein the liquid reservoir portion comprises a liquid filler pipe and a pump for delivery of fluid from the liquid reservoir portion.

4. The automotive air filter assembly of claim 3 wherein said liquid reservoir portion comprises a liquid level sensor.

5. The automotive air filter assembly of claim 3 wherein said air flow chamber comprises includes at least two acoustic resonance chambers and wherein said panel filter includes a housing, a retainer and a replaceable filtration media.

6. The automotive air filter assembly of claim 5 wherein said automotive air filter assembly further comprises a second liquid reservoir portion for containing a second liquid.

7. The automotive air filter assembly of claim 2 wherein said air flow chamber portion comprises at least one acoustic resonance chamber.

8. The automotive air filter assembly of claim 2 wherein said air flow chamber portion comprises at least two acoustic resonance chambers.

9. The automotive air filter assembly of claim 2 wherein the air flow inlet includes an air inlet snorkel and said snorkel comprises at least one duct connection for ducting said snorkel to a resonance chamber.

10. The automotive air filter assembly of claim 2 wherein said panel filter comprises a housing, a retainer and a replaceable filtration media.

11. The automotive air filter assembly of claim 1 wherein said liquid reservoir portion comprises a mating surface and said mating surface of said liquid reservoir portion and said air flow chamber portion together, comprise a closed air flow chamber having said air flow inlet and said air flow outlet.

12. The automotive air filter assembly of claim 11 wherein said mating surface of said liquid reservoir portion comprises a recess to receive an end portion of said panel filter.

13. The automotive air filter assembly of claim 12 wherein said liquid reservoir portion comprises a boss, said boss defining a liquid inlet aperture to said closed internal chamber.

14. The automotive air filter assembly of claim 13 wherein said air flow chamber portion comprises a boss, the boss of said air flow chamber portion, registering with said boss of said liquid reservoir portion so that said bosses together comprise an inlet passageway for placing fluids in said closed internal chamber.

15. The automotive air filter assembly of claim 14 wherein said assembly comprises a filler pipe in registry with said boss of said air flow chamber portion.

16. The automotive air filter assembly of claim 15 wherein said air flow inlet includes a snorkel air inlet and wherein said liquid reservoir portion comprises a recess for accommodating said snorkel.

17. The automotive air filter assembly of claim 16 wherein said liquid reservoir portion comprises a first mounting flange and said air flow chamber portion comprises a second mounting flange and said assembly further comprises a plurality of fasteners extending through at least one of said first and second flanges to fix together said flow chamber portion and said liquid reservoir portion.

* * * * *